(12) United States Patent
Kristjansson et al.

(10) Patent No.: US 8,983,845 B1
(45) Date of Patent: Mar. 17, 2015

(54) THIRD-PARTY AUDIO SUBSYSTEM ENHANCEMENT

(75) Inventors: Trausti Kristjansson, Hartsdale, NY (US); David Talkin, Newton, MA (US)

(73) Assignee: Google Inc., Mountain View, CA (US)

( * ) Notice: Subject to any disclaimer, the term of this patent is extended or adjusted under 35 U.S.C. 154(b) by 519 days.

(21) Appl. No.: 12/732,788

(22) Filed: Mar. 26, 2010

(51) Int. Cl.
*G10L 21/00* (2013.01)
*G10L 25/00* (2013.01)
*G10L 15/00* (2013.01)
*H04R 29/00* (2006.01)
*H04L 12/24* (2006.01)

(52) U.S. Cl.
CPC ............ *G10L 21/00* (2013.01); *H04L 41/0803* (2013.01)
USPC ........... 704/275; 704/270.1; 704/231; 381/58

(58) Field of Classification Search
CPC ... G10L 21/00; H04M 3/2236; H04L 41/0803
USPC ......... 704/231, 233, 243, 246, 251, 257, 270, 704/275; 381/58
See application file for complete search history.

(56) References Cited

U.S. PATENT DOCUMENTS

| | | | |
|---|---|---|---|
| 5,758,049 A * | 5/1998 | Johnson et al. ................ | 715/206 |
| 5,950,157 A | 9/1999 | Heck et al. | |
| 5,991,712 A * | 11/1999 | Martin ............................. | 704/9 |
| 6,125,345 A * | 9/2000 | Modi et al. .................... | 704/240 |
| 6,571,210 B2 * | 5/2003 | Hon et al. ...................... | 704/251 |
| 7,243,068 B2 | 7/2007 | Barker et al. | |
| 7,499,856 B2 | 3/2009 | Takahashi et al. | |
| 7,912,713 B2 * | 3/2011 | Vair et al. ...................... | 704/236 |
| 8,050,918 B2 * | 11/2011 | Ghasemi et al. .............. | 704/244 |
| 8,135,654 B2 * | 3/2012 | Dhanekula et al. ............. | 706/12 |
| 2002/0087321 A1 * | 7/2002 | Watanabe et al. ............. | 704/270 |
| 2003/0120486 A1 * | 6/2003 | Brittan et al. ................ | 704/231 |
| 2003/0187639 A1 * | 10/2003 | Mills ............................. | 704/231 |
| 2005/0069853 A1 | 3/2005 | Tyson et al. | |
| 2005/0071166 A1 * | 3/2005 | Comerford et al. ........... | 704/272 |
| 2005/0120208 A1 * | 6/2005 | Albert Dobson ............. | 713/160 |
| 2005/0130645 A1 * | 6/2005 | Albert Dobson et al. ..... | 455/423 |
| 2005/0131676 A1 * | 6/2005 | Ghasemi et al. .............. | 704/201 |
| 2006/0106613 A1 * | 5/2006 | Mills ............................. | 704/270 |

(Continued)

OTHER PUBLICATIONS

Office Action issued in U.S. Appl. No. 13/249,348 on Nov. 28, 2011, 21 pages.

(Continued)

*Primary Examiner* — Douglas Godbold
*Assistant Examiner* — Michael Ortiz Sanchez
(74) *Attorney, Agent, or Firm* — Fish & Richardson P.C.

(57) ABSTRACT

Methods, systems, and apparatus, including computer programs encoded on computer storage media, for performing audio subsystem enhancement. In one aspect, a method includes: receiving a voice search query by an automatic speech recognition (ASR) engine that processes voice search queries for a search engine, wherein the voice search query includes an audio signal that corresponds to an utterance, and a test flag that indicates that an audio test is being performed; performing speech recognition on the audio signal to select one or more textual, candidate transcriptions that match the utterance; generating, in response to receiving the test flag, one or more audio quality metrics using the audio signal; and generating a response to the voice search query by the ASR engine, wherein the response references one or more of the candidate transcriptions and one or more of the audio quality metrics.

20 Claims, 4 Drawing Sheets

(56) References Cited

U.S. PATENT DOCUMENTS

| | | | |
|---|---|---|---|
| 2006/0111904 A1* | 5/2006 | Wasserblat et al. | 704/246 |
| 2006/0234639 A1* | 10/2006 | Kushwaha et al. | 455/67.11 |
| 2007/0061096 A1* | 3/2007 | Mok | 702/118 |
| 2009/0099836 A1* | 4/2009 | Jacobsen et al. | 704/3 |
| 2009/0112593 A1 | 4/2009 | Konig et al. | |
| 2010/0145891 A1* | 6/2010 | Dhanekula et al. | 706/12 |

OTHER PUBLICATIONS

Office Action issued in U.S. Appl. No. 13/249,348 on Jun. 8, 2012, 28 pages.

Office Action issued in U.S. Appl. No. 13/249,348 on Oct. 23, 2012.

\* cited by examiner

FIG. 3 ized audio input using a mobile device, and sending the recorded audio to an automated speech recognition (ASR) engine that processes voice queries for a search engine. By comparing the recorded audio to the standardized audio output, the ASR engine can generate and relay audio quality information back to the manufacturer or developer, to assist in the reconfiguration, redesign, or other enhancement of the mobile device.
THIRD-PARTY AUDIO SUBSYSTEM ENHANCEMENT

BACKGROUND

This specification relates to search engines.

A search query includes one or more query terms that a user submits to a search engine when the user requests the search engine to execute a search. The user may, for example, enter the query terms by typing on a keyboard, or by speaking the query terms into a microphone of a mobile device.

When speaking query terms, audio distortion caused by clipping, lost samples, or microphone frequency response non-linearity can significantly impact recognition accuracy. Because the design and configuration of an audio subsystem of a mobile device may involve a collaboration between multiple parties, it is oftentimes difficult to address problems that are caused by individual designs, partly due to communication problems that are aggravated by corporate boundaries, intellectual property issues, trade secrets, and other factors.

SUMMARY

In general, one innovative aspect of the subject matter described in this specification may be embodied in methods that allow the manufacturer or developer of a mobile device (referred to by this specification as "third parties") to enhance the audio subsystems of mobile devices that are under their control. In particular, the method includes recording a standardized audio input using a mobile device, and sending the recorded audio to an automated speech recognition (ASR) engine that processes voice queries for a search engine. By comparing the recorded audio to the standardized audio output, the ASR engine can generate and relay audio quality information back to the manufacturer or developer, to assist in the reconfiguration, redesign, or other enhancement of the mobile device.

In this regard, a manufacturer or developer can test a mobile device to determine how effective a particular design or configuration works with respect to a speech recognition operation performed by the ASR engine. Such testing may alleviate a significant burden from the operators of the ASR engine or the search engine, because each new mobile device that is under design or that appears on the market would not have to be tested by the operators of the ASR system or search engine for compatibility with the ASR or the search engine.

In general, another innovative aspect of the subject matter described in this specification may be embodied in methods that include the actions of receiving a voice search query by an ASR engine that processes voice search queries for a search engine, where the voice search query includes an audio signal that corresponds to an utterance, and a test flag that indicates that an audio test is being performed; performing speech recognition on the audio signal to select one or more textual, candidate transcriptions that match the utterance; generating, in response to receiving the test flag, one or more audio quality metrics using the audio signal; and generating a response to the voice search query by the ASR engine, where the response references one or more of the candidate transcriptions and one or more of the audio quality metrics.

Other embodiments of this aspect include corresponding systems, apparatus, and computer programs, configured to perform the actions of the methods, encoded on computer storage devices.

These and other embodiments may each optionally include one or more of the following features. For instance, based on receiving the test flag, the response may not reference a result of executing the voice search query by the search engine; the actions may further include withholding the one or more candidate transcriptions from the search engine; where generating one or more quality metrics using the audio signal may include comparing the audio signal to one or more pre-recorded utterances; the actions may also include receiving audio test data including the pre-recorded utterances and one or more transcriptions associated with each of the pre-recorded utterances; performing speech recognition on the audio signal to select one or more textual, candidate transcriptions that match the utterance may include establishing a speech recognition confidence value for each candidate transcription, or performing speech recognition on the audio signal to select an n-best of the candidate transcriptions that have the n-highest speech recognition confidence values; generating one or more audio quality metrics using the audio signal may include determining an amount of clipping, a gain, a signal-to-noise ratio (SNR), an onset point, or an offset point of the audio signal; the voice search query may include data that references a third party who is performing the audio test, or data that references a type of audio test being performed; generating the audio quality metrics ma include generating the audio quality metrics based on the type of audio test being performed; the voice search query may include data that references a type of a mobile device, and the actions may further include updating an acoustic model that is specific to the type of the mobile device, using the audio signal; the voice search query may include data that references a term that is actually being uttered by the utterance; the actions may include communicating an exclusion flag to the search engine, where the exclusion flag indicates to the search engine that results of executing search queries using the one or more candidate transcriptions are to be excluded from live search traffic statistics; the actions may include providing the response to a mobile device at which the voice search query originated; the test flag may indicate that the audio test is being performed on a mobile device that generated the audio signal, or on a mockup of the mobile device that generated the audio signal; the actions may include disabling a learning adaptation of the ASR engine based on receiving the test flag.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
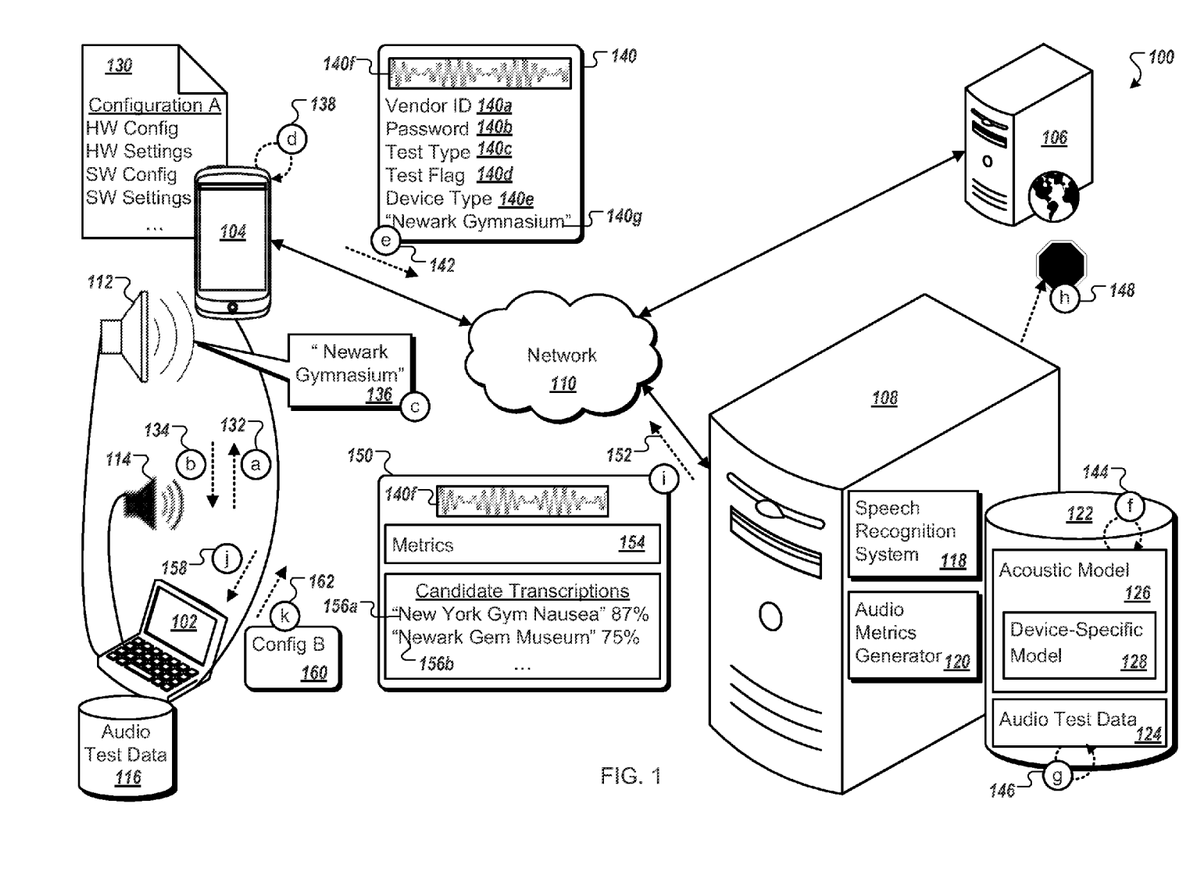
FIG. 1 is a diagram of an example system that supports third-party audio subsystem enhancement.

FIG. 1 is a diagram of an example system 100 that supports third-party audio subsystem enhancement, the diagram further illustrating a flow of data within the system 100 during time-sequenced states (a) to (k). Using the system 100, a third-party manufacturer or developer of a mobile device can set up a networked test scenario that automatically run audio subsystem tests for validating and enhancing hardware and/or software configurations of the mobile device, using prerecorded utterances. The audio subsystems tested can include, in some examples, microphones and/or gain and noise canceling hardware and software. In some examples, the system 100 can grade the audio quality of the output of the tests run in the networked test scenario based upon evidence of audio distortion or audio artifacts.

The system 100 includes a test setup consisting of a testing computer 102, a mobile device 104, an artificial mouth 112, and a speaker 114. Audio test data 116 accessible to the testing computer 102 can be played through the artificial mouth 112 and, optionally, the speaker 114, to simulate a user speaking into the microphone of the mobile device 104. The artificial mouth 112 can include a specialized speaker system designed to simulate human speech by approximating the acoustic field generated by a human mouth. The speaker system, in some implementations, can include a loudspeaker positioned in an enclosure designed to produce a directivity and radiation pattern mimicking an average human mouth.

The system 100 also includes a search engine 106 and an automatic speech recognition (ASR) engine 108, which are connected to the testing computer 102 and/or the mobile device 104 by one or more networks 110 such as, in some examples, a wireless cellular network, a wireless local area network (WLAN) or Wi-Fi network, a Third Generation (3G) mobile telecommunications network, a private network such as an intranet, a public network such as the Internet, or some combination thereof). In general, the ASR engine 108 can translate or transcribe utterances detected by the mobile device 104 into one or more textual, candidate transcriptions, and can provide those candidate transcriptions as query terms to the search engine 106, thus enabling an audio search functionality for the mobile device 104.

As used by this specification, a "term" (or "query term") includes one or more whole or partial words, characters, or strings of characters, and a "search query" includes the one or more query terms that the user submits to a search engine when the user requests the search engine to execute a search. Among other things, a "result" (or a "search result") of the search includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

The mobile device 104 can be a device developed by a third party vendor, and can be configured by the third party vendor to initiate voice search queries using the ASR engine 108 and search engine 106. In some implementations, multiple third party vendors develop multiple mobile devices, each device potentially including differing hardware and software components such as, in some examples, different wideband audio or high definition (HD) audio chips, microphones, or audio processing algorithms. Each component of each mobile device configuration can potentially contribute to inconsistencies that impact the accuracy of the speech recognition. In some examples, clipping, cut-off, lost samples, microphone frequency response non-linearities, noise corruption, or audio feedback contamination can lower the quality of the audio output of the mobile device 104.

To test the mobile device 104, the testing computer 102 can provide various audio test data 116 to the mobile device 104 through the artificial mouth 112 and, optionally, the speaker 114. The audio test data 116, in some examples, can include pre-recorded utterances of various lengths, volume, along with samples of differing background noise. The utterances, for example, can each contain a word or phrase. In some implementations, the utterances correlate to terms a user may commonly use when posing queries to a search engine. The utterances, in some examples, can include multiple languages, various accents of a particular language, or various vocal ranges within a particular accent of a particular language.

If a given test included in the audio test data 116 has a background noise element, the background noise can be played through the speaker 114 while a different or main utterance is played through the artificial mouth 112. The background noise or, optionally, "cafeteria chatter," can be provided to simulate a mobile phone user in a typical use environment. Some examples of background noise include vehicle noise, music, sirens, applause, or household appliances. Cafeteria chatter can include one or more individual voices performing utterances, used to mimic a user surrounded by other people. Cafeteria chatter, for example, can simulate a user speaking on the mobile device 104 in a public place such as in a restaurant, workplace, or shopping mall environment. The mobile device, when capturing the utterance provided by the testing computer 104 into an audio signal, can be designed to filter out the background and cafeteria chatter sounds or to strengthen the detected main utterance.

The testing computer 102, in some implementations, may be directly connected to the mobile device 104 to provide input to the mobile device 104 or to receive data from the mobile device 104. The connection between the mobile device 104 and the testing computer 102 can include a wired or wireless connection, such as, in some examples, a USB cable, serial cable, blue tooth connection, or infrared (e.g., Infrared Data Association (IrDA) protocol) connection. The input provided by the testing computer 102 to the mobile device 104 can include an indication (e.g., a software simulation of a button push) initiating voice search input, such as an electronic trigger of a search command input (e.g., button, icon, menu option, etc.). Data provided from the mobile device 104 to the testing computer 102 can include recordings of the audio signals generated by the mobile device 104 based upon the audio test data 116 issued from the testing computer 102 to the artificial mouth 112 and the speaker 114.

The audio signal generated by the mobile device 104 can additionally be provided to the ASR engine 108 through the network(s) 110, which may include an over-the-air, cellular network. The ASR engine 108 includes a speech recognition system 118 and an audio metrics generator 120. When the audio signal is received by the ASR engine 108, the speech recognition system 118 can translate or transcribe the utterance(s) into a candidate transcription. In some implementations, one or more additional candidate transcriptions can also be generated. For example, the speech recognition system 118 can transcribe each utterance to associate the utterance with one or more terms and can assign a confidence level associated with each transcription of the utterance(s). Along with the audio signal, in some implementations, the mobile device 104 can provide regional or language information to the ASR engine 108. For example, the region in which the mobile device 104 is registered or the language setting of the mobile device 104 can indicate to the ASR engine 108 the likely language or accent of the user of the mobile device 104. A different variation of the speech recognition system 118 can be used, in some implementations, based upon the anticipated language or accent of the user of the mobile device 104.

One or more of the candidate transcriptions generated by the speech recognition system 118 can be passed to the search engine 106 from the ASR engine 108 as search query terms. The search engine 106 can use the search query terms to provide query results (e.g., Uniform Resource Identifiers (URIs) of web pages, images, documents, multimedia files, etc.) to the mobile device 104. The search engine 106, in some examples, can include a web search engine used to find references within the Internet, a phone book type search engine used to find businesses or individuals, or another specialized search engine (e.g., entertainment listings such as restaurants and movie theater information, medical and pharmaceutical information, etc.).

In addition to passing the audio signal to the search engine 106, the ASR engine 108, in some implementations, can critique the quality of the audio signal using the audio metrics generator 120. For example, based upon a test flag and, optionally, additional test parameters provided with the audio signal transmitted by the mobile device 104, the audio metrics generator 120 can supply one or more audio metrics regarding the audio signal to the issuing mobile device 104. The audio metrics, for example, can include information regarding gain, clipping, recognition confidence, or signal-to-noise ratio (SNR).

In some implementations, the audio metrics generator 120 can compare the audio signal to original audio test data, for example based upon an audio test identification provided by the mobile device 104. The ASR engine 108 includes a data store 122 containing audio test data 124 (e.g., including, in part, one or more elements of the audio test data 116). The audio metrics generator 120, for example, can compare the audio signal provided by the mobile device 104 to the original utterance(s) provided to the mobile device 104 through the artificial mouth 112 to determine a relative similarity between the two waveforms.

In some implementations, the types of metrics provided by the audio metrics generator 120 can be determined, in part, based upon the type of test being conducted. For example, using a test type indicator provided by the mobile device 104 or retrieving a test type indicated from the audio test data 124, the audio metrics generator 120 can determine a set of relevant metrics. If, for example, the audio test data 116 provided to the mobile device 104 included background noise (e.g., played through the speaker 114), the audio metrics generator 120 can generate a metric regarding a signal to noise ratio of the audio signal.

The data store 122 also includes an acoustic model 126, sub-classified into a device-specific model 128. The acoustic model 126 and the device-specific model 128, in some implementations, the acoustic model 126 or device-specific model 128 can be further segmented into language-specific models or region-specific models (e.g., based upon a particular accent of a particular language) in the ASR engine 108. When training acoustic models, in general, a very large amount of data, including millions of utterances, can be fed into a system, so that statistical analysis can be made of the various recordings of the same transcribed utterance. The various recordings, for example, can include a range of volumes, accents, ages, and male and female voices.

In some implementations, a third-party tester can provide audio test data to the ASR engine 108 (e.g., from the computing device 102), including transcriptions and recordings of utterances, and this test data (e.g., added to the audio test data 124) can be used to generate the device-specific model 128. In this manner, the third-party tester can establish individualized tests while contributing to the improvement of the acoustic model used by the speech recognition system 118 of the ASR engine 108.

The time sequenced states (a) through (k) detail an example process flow during an audio test conducted in the system 100. The initial test conditions include a first configuration 130 of the mobile device 104, including a particular hardware configuration, hardware settings, software configuration, and software settings. In some implementations, a portion of these settings can be changed during a testing period that includes multiple audio tests in order to determine a configuration that displays the best overall audio metrics, and is thus enhanced or optimized for use with voice search queries. One or more of the parameters of the configuration 130, for example, can be adjusted by the testing computer 102 when initializing a test or test sequence.

The process flow begins with state (a) 132, where the testing computer 102 simulates a control activation on the mobile device 104, initiating voice search input. For example, a test program running on the testing computer 102 can issue a command to the mobile device 104 to simulate a button press. In some implementations, the testing computer 102 can instead trigger a robotic finger to physically activate a control on the mobile device 104.

In state (b) 134, the mobile device 104 issues a confirmation to the testing computer 102. The confirmation, for example, can alert the testing computer 102 that audio recording has been initiated upon the mobile device 104, or that the mobile device 104 is ready to receive a voice input.

In state (c) 136, the sample utterance "Newark Gymnasium" is played through the artificial mouth 112. If the audio test includes background noise or cafeteria noise (babble), the background audio track can be played simultaneously through the speaker 114.

The mobile device 104 can record the utterance, in state (d) 138, and store the audio signal for future reference. In state (e) 142, the mobile device can communicate a voice search query 140 to the ASR engine 108 through the network 110. In some implementations, the voice search query 140 can be provided across a data network rather than a cellular network, for example, to reduce the number of variables in determining audio quality. The network connection can be selected, in part, to assure consistency in transport.

The voice search query 140, in addition to an audio signal 140f of the utterance "Newark Gymnasium," can include a test flag 140d, alerting the ASR engine 108 that the voice search query 140 is related to audio test data. The flag, for example, can include a bit or a variable included in the voice search query 140. Other optional information within the voice search query 140 can include, in some examples, a vendor identification 140a, uniquely identifying the third-party tester of the mobile device 104, a password 140b, providing access to a test mode of the ASR engine 108 or the audio metrics generator 120 within the ASR engine 108, a test type 140c, indicating the type of audio test being run, a device type 140e, uniquely identifying the model of the mobile device 104, or a transcription 140g of the utterance "Newark Gymnasium."

In some implementations, rather than including the test flag 140d, the password 140b can be considered to be indicative that the voice search query 140 contains test data, or the voice search query 140 can be issued to a test destination. For example, the voice search query 140 can be sent to a different route (e.g., domain name variation) than the common route taken to reach the ASR engine 108 to indicate to the ASR engine 108 that the voice search query 140 is being issued for testing purposes. In this manner, the route variation can be considered to be a test flag when received by the ASR engine 108 or a gateway server thereof, or the gateway server may add the test flag to the voice search query 140.

The voice search query 140, in some implementations, is transferred to the ASR engine 108 using a special communications protocol. For example, a speech recognition communication protocol can include a standardized format for transmitting speech queries and search results between a mobile device and the ASR engine 108 or search engine 106. The protocol can include, in some examples, information regarding language model, optional accent model, maximum number of search results, or account identifier or user identifier (e.g., telephone number) of the user submitting the search query or the device from which the query was submitted. The communications protocol can be expanded or adjusted to take into account the additional variables related to audio test data. For example, the vendor identification 140$a$, password 140$b$, test type 140$c$, test flag 140$d$, or device type 140$e$ can be included within the communications protocol extension.

In state (f) 144, the speech recognition system 118 of the ASR engine 108 performs recognition upon the audio signal 140$f$ based upon, for example, the language specified within the protocol of the voice search query 140 (e.g., using a language-specific model within the acoustic model 126). If the voice search query 140 includes a device type 140$e$, the device-specific model 128 can be updated based on the voice search query 140. The speech recognition system 118 can generate a candidate transcription or a ranked set of candidate transcriptions matching the utterance detected within the audio signal 140$f$. In some implementations, the speech recognition system 118 can generate data to be added to the audio test data 124 based upon the contents of the voice search query 140 (e.g., a combination of the audio signal 140$f$ and the transcription 140$g$).

The audio metrics generator 120 of the ASR engine 108 can generate metrics regarding the voice search query 140, in state (g) 146, based upon the audio test data 124. In some examples, clipping, gain, confidence, signal-to-noise ratio, or end-pointer metrics (e.g., determining the beginning and end of utterances as compared to background noise, babble, or speech transients) can be generated based upon a comparison of the audio signal 140$f$ to the audio test data 124. The metrics can be used to determine that the audio signal 140$f$ recorded by the mobile device 104 has been transmitted without corruption, cut-off, audio feedback contamination or other audio artifacts, and that the end-pointer and other aspects of the mobile device 104 are performing as anticipated.

In some implementations, the audio metrics generator 120 can perform metrics generation based upon the password 140$b$ or the vendor identification 140$a$ received with the voice search query 140. For example, the ASR engine 108 may first authenticate the third-party tester before providing information to the audio metrics generator 120. Certain tests or test features, for example, may be available based upon the particular vendor as identified by the password 140$b$ or the vendor identification 140$a$.

In an optional state (h) 148, the ASR engine 108, recognizing that the voice search query 140 includes test data, can skip the step of providing the candidate transcriptions to the search engine 106. For example, because the voice search query 140 is a test, there is no interest in the results obtained by the audio signal 140$f$. Additionally, any query requests received by the search engine 106 may contribute to search statistics and the promotion of search results, a potentially undesirable outcome when issuing hundreds or thousands of variations of standardized test data. In other implementations, one or more candidate transcriptions can be provided to the search engine 106 as query terms along with a flag notifying the search engine 106 that the query terms are the result of test data.

Similarly, the ASR engine 108 can recognize that the voice search query 140, being test data, should not contribute to certain statistics collection or query sampling activities. For example, the ASR engine 108 may, in general, be adaptable to learn the characteristics of an individual speaker, such as voice characteristics, accent characteristics, or search history. When submitting test data, one or more learning adaptations of the ASR engine 108 may be disabled.

The ASR engine 108 issues a response message 150 to the mobile device 104 in state (i) 152, including a set of metrics 154 and a set of candidate transcriptions 156. The candidate transcriptions 156 can be ranked in order of confidence, optionally noting a confidence rating associated with each candidate transcription 156. For example, a first candidate transcription 156$a$, associated with a confidence rating of eighty-seven percent, contains the query term "New York Gym Nausea." A second candidate transcription 156$b$, associated with a confidence rating of seventy-five percent, contains the query term "Newark Gem Museum."

In some implementations, the candidate transcriptions 156 can be issued in a separate response message than the metrics 154. The audio signal 140$f$ or search results from the search engine 106 may optionally be provided back to the mobile device 104 as well. The candidate transcriptions 156, metrics 154, or optional search results, in some implementations, can be displayed by the mobile device 104.

In state (j) 158, the mobile device 104 provides the stored audio signal and the information provided in the response message 150 (e.g., the metrics 154 and the candidate transcriptions 156) to the testing computer 102. In some implementations, the mobile device 104 can store multiple audio signals, metrics, and candidate transcriptions. The data can be downloaded to the testing computer 102, for example, at the completion of a test suite.

The testing computer 102 reconfigures the mobile device 104, in state (k) 162, by issuing a set of configuration parameters 160. In some implementations, the configuration parameters 160 are determined, in part, based upon the results obtained through the previous audio test. The testing computer 102, for example, can run a script to analyze the candidate transcriptions 156, the metrics 154, and the audio signal 140$f$ to identify any audio problems or areas for enhancement. For example, if the metrics 154 indicate that there is a problem in gain, the microphone configuration of the mobile device 104 can be adjusted accordingly. The configuration parameters 160, in some implementations, are stock configurations associated with particular tests run within a suite of tests by the testing computer 102.

In some implementations, the testing computer 102 analyzes the test data in comparison to a set of base metrics. The base metrics, for example, can be associated with a previously tested or approved mobile device. A base metric waveform, for example, can be compared to the audio signal 140$f$, and the distances between the two waveforms can be computed in terms of spectrogram. The waveform comparison, in some examples, can determine clicks, clipping, or portions of missing audio. In some implementations, one or more metrics can be compared to threshold values, determining a pass or fail rating.

The testing computer 102 can continue to provide audio test data 116 to the mobile device 104 and to analyze the resultant audio signals and metrics obtained through the tests. In some implementations, fifty, one hundred, or one thousand iterations of each test can be run. For example, minor adjustments to individual configuration parameters can be made each time the same audio test data 116 is run through the system 100. During this automated process, an enhanced or optimal configuration of the mobile device 104 can be determined.

The testing computer 102, in some implementations, can determine statistical metrics, such as pass/fail ratings, based upon calculating the average values of metrics obtained through multiple (e.g., 50, 100, 500, etc.) similar or identical test runs. For example, the results of one hundred tests including a same configuration of the mobile device 104 and differing audio test data can be collected and analyzed to determine a pass/fail rating.

In some implementations, rather than testing the mobile device 104, the third-party tester can mimic a mobile device using, for example, a test board. In this manner, the third-party tester can evaluate new hardware (e.g., microphone, HD chip, etc.) before designing the hardware element into a mobile device model.

The response message 150, in some implementations, can be issued directly to the testing computer 102 (e.g., in addition to or rather than being issued to the mobile device 104). For example, the vendor identifier 140a or another field of the voice search query 140 can provide information usable by the ASR engine 108 to forward the response message 150 to the testing computer 102.

Rather than generating metrics at the ASR engine 108 using the audio metrics generator 120, in some implementations the testing computer 102 includes an audio metrics generator 120. For example, the testing computer 102 can generate metrics based upon candidate transcriptions provided by the ASR engine 108 and the recorded audio signal (e.g., recorded by the mobile device 104 or provided by the ASR engine 108).

Figure 2:
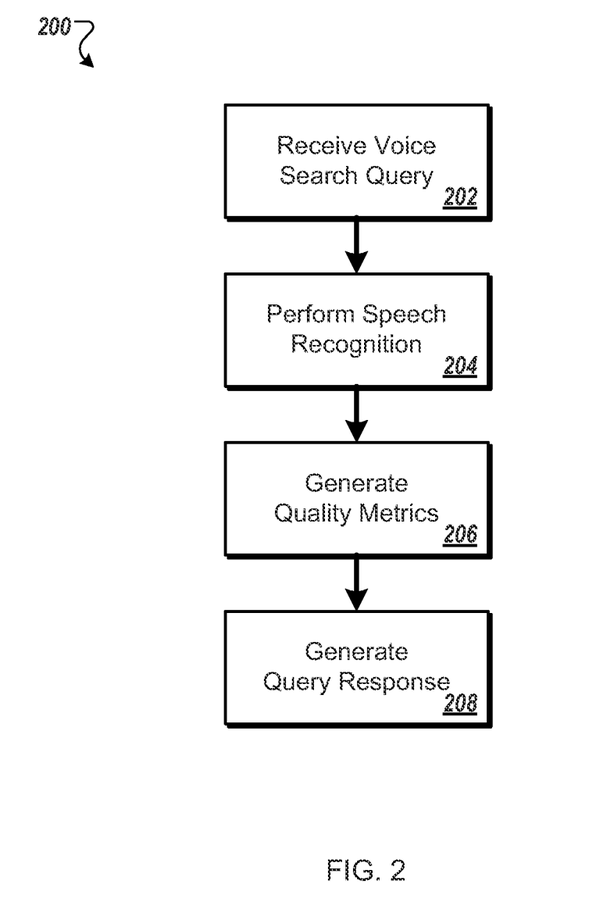
FIG. 2 is a flowchart of an example process.

FIG. 2 is a flowchart of an exemplary process 200. Briefly, the process includes receiving a voice search query by an ASR engine that processes voice search queries for a search engine. The voice search query includes an audio signal that corresponds to an utterance and a test flag that indicates that an audio test is being performed on a mobile device that generated the audio signal. Speech recognition is performed on the audio signal to select one or more textual, candidate transcriptions that match the utterance. In response to receiving the test flag, one or more audio quality metrics are generated using the audio signal. A response, referencing one or more of the candidate transcriptions and one or more of the audio quality metrics, is generated to the voice search query by an automatic speech recognition engine.

In more detail, when process 200 begins, a voice search query is received by an ASR engine that processes voice search queries for a search engine (202). The voice search query includes an audio signal that corresponds to an utterance, and a test flag that indicates that an audio test is being performed on a mobile device that generated the audio signal. The voice search query may include data that references a third party who is performing the audio test on the mobile device, data that references a type of audio test being performed on the mobile device, data that references a type of the audio device, or data that references a term that is actually being uttered by the utterance.

Speech recognition is performed on the audio signal to select one or more textual, candidate transcriptions that match the utterance (204). The ASR engine, for example, can generate multiple candidate transcriptions based upon the audio signal. A speech recognition confidence value can be established for each candidate transcription. A number of best candidate transcriptions (e.g., N-best), having the highest speech recognition confidence values of the candidate transcriptions, are selected. In some implementations, a language model that is specific to the type of the mobile device can be updated using the audio signal.

The candidate transcription(s), in some implementations, can be withheld from the search engine. In some implementations, an exclusion flag can be communicated to the search engine indicating to the search engine that results of executing search queries using the candidate transcription(s) are to be excluded from live search traffic statistics.

In response to receiving the test flag, one or more audio quality metrics are generated using the audio signal (206). In some implementations, the audio signal can be compared to one or more pre-recorded utterances. The audio quality metrics generation, in some examples, can include determining an amount of clipping, a gain, a SNR, an onset point, or an offset point of the audio signal.

A response to the voice search query is generated by the ASR engine (208), thereby ending the process 200. The response can reference one or more of the candidate transcriptions and one or more of the audio quality metrics. The response may be provided to the mobile device. In some implementations, based on receiving the test flag, the response does not reference a result of executing the voice search query by the search engine.

Figure 3:
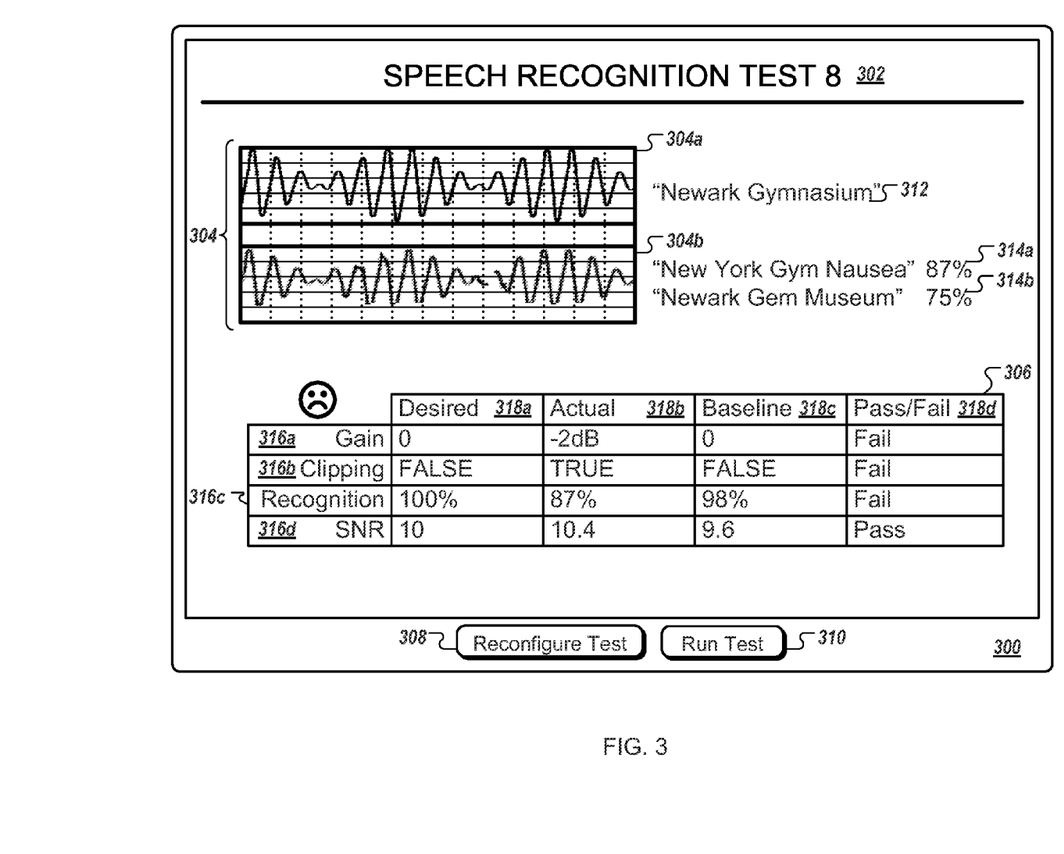
FIG. 3 is a screen shot showing an output report related to an audio subsystem test.

FIG. 3 is a screen shot 300 showing an output report 302 related to an audio subsystem test. The output report 302, for example, can be rendered upon the display of the testing computer 102, described in relation to FIG. 1, after the testing results have been analyzed. The output report 302 includes a waveform comparison 304 and a metrics analysis table 306. Upon reviewing the results presented in the output report 302, for example, a user can select a reconfigure test button 308 to alter the configuration of the mobile device being tested or a run test button 310 to retry the test.

As shown in the waveform comparison 304, an original waveform 304a (e.g., the waveform provided to the artificial mouth 112 as test data) is plotted above a recorded waveform 304b (e.g., recorded by the mobile device 104 or provided within the response message 150). In comparing the two waveforms, evidence of clipping and missing audio signal (e.g., the first portion of the waveform 304b) can be seen.

Alongside the original waveform 304a, an original transcription 312 "Newark Gymnasium" is presented. In comparison, alongside the recorded waveform 304b, a first candidate transcription "New York Gym Nausea" 314a and a second candidate transcription "Newark Gem Museum" 314b are displayed. The candidate transcriptions 314 include confidence ratings of eighty-seven percent and seventy-five percent, respectively.

Beneath the waveform comparison 304, the metrics analysis table 306 presents data regarding a set of metrics 316 against a desired value 318a, an actual (measured) value 318b, and a baseline value 318c. A pass/fail rating 318d is presented in the final column of the metrics analysis table 306. The set of metrics 316 includes a gain metric 316a rated as failing for being measured at two decibels below desired or baseline, a clipping metric 316b rated as failing for showing a clipping measurement, a recognition metric 316c rated as failing for showing a transcription confidence rating of eighty-seven percent as compared to a ninety-six percent desired value, and an SNR metric 316d rated as passing for having a signal-to-noise ratio superior to both the baseline value and the desired value.

Other metrics can be provided within the output report 302, and additional output reports may compare the outcome of two or more tests run against various mobile device configurations. The test data, in addition to being displayed upon the testing computer 102, can be stored within the testing computer 102 or an external storage device (e.g., the audio test data store 116 or other data store). In some implementations, individual metrics can be selected from within the output report 302 to gain access to a more detailed analysis.

Figure 4:
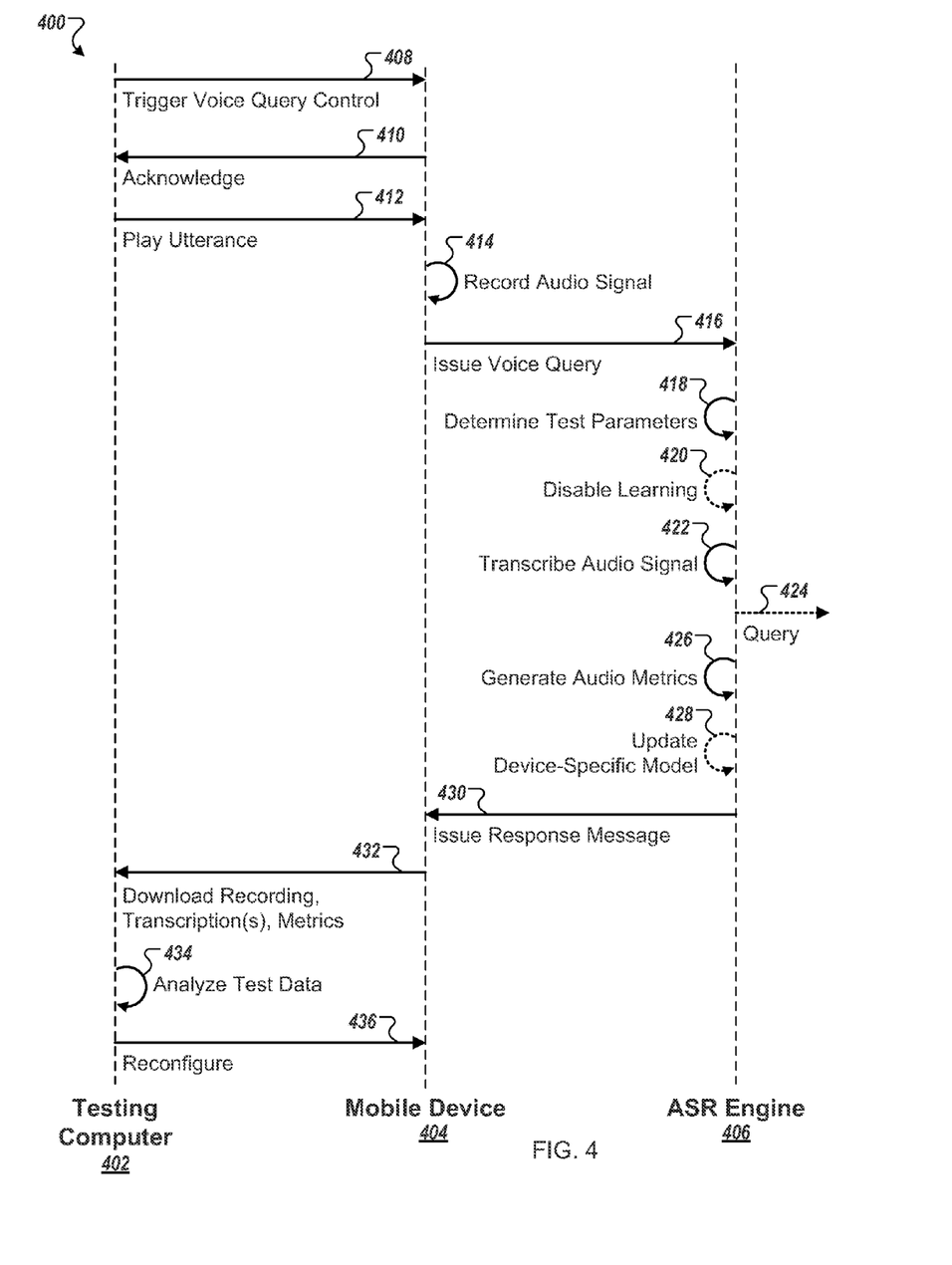
FIG. 4 is a swim lane diagram of an example process.

FIG. 4 shows a swim lane diagram of an example process 400 for supporting third-party audio subsystem enhancement. The process 400 includes a testing computer 402, a mobile device 404, and an ASR engine 406. The testing computer 402 can initiate a voice search query on the mobile device 404 using audio test data. The mobile device 404 provides the voice search query to the ASR engine 406, and the response data received from the ASR engine 406 can be provided to the testing computer 402 for audio metrics analysis.

The process 400 begins with the testing computer 402 issuing 408 a voice search query control signal to the mobile device 404. The control signal, for example, can activate a voice search query mode of the mobile device 404 electronically (e.g., through a connection between the testing computer 402 and the mobile device 404) or physically (e.g., by actuating a robotic finger to press a control on the mobile device 404).

The mobile device 404 issues 410 an acknowledgement to the testing computer 402. The acknowledgement can alert the testing computer 402 to the readiness of the mobile device 404 to record an utterance.

The testing computer 402 plays 412 an utterance for the mobile device 404. The utterance can be broadcast, for example, to the microphone of the mobile device 404 from a loudspeaker or an artificial mouth speaker system. The artificial mouth, for example, can be positioned at a similar alignment to the mobile device 104 as the mouth of an average user when the mobile device 104 is held to the ear of the user.

In some implementations, in addition to the utterance, background noise or chatter can be played through the artificial mouth speaker system or a secondary speaker. The secondary speaker, for example, can be positioned a distance away from the primary (e.g., artificial mouth) speaker.

The mobile device 404 records 414 the audio signal. During recording, the audio subsystem of the mobile device 404 can filter, amplify, or otherwise enhance the sound received from the artificial mouth and the secondary speaker. For example, the audio subsystem of the mobile device 404 can apply transformations to the waveform collected by the microphone to separate the utterance from the background noise or cafeteria chatter.

The mobile device 404 issues 416 a voice search query message to the ASR engine 406, including a test flag indicating that the voice search query includes test data. Optionally, the voice search query message can indicate a type of test, a transcription of the test data, a third-party identification, a password, or a mobile device type identification. In some implementations, the voice search query message is generated using a speech recognition communication protocol.

The ASR engine 406 determines 418 test parameters from the search query message content. For example, upon recognizing that the query message indicates test data (e.g., a true value of a binary test flag), the ASR engine 406 can collect additional test parameters issued within the query message. For example, the ASR engine 406 can unlock or enable one or more audio metric generation features using a provided test type identification, password or third-party identification.

If the ASR engine 406 includes stateful learning features, the ASR Engine 406 can optionally disable 420 learning adaptation. In this manner, information regarding the test data will not contribute to enhancements applied to future query messages received by the ASR engine 406 from the mobile device 404. For example, as a typical functionality, the ASR engine 406 can attempt to learn a particular vocal style or accent of the user of a mobile device, applying the learned vocal style to future queries to improve utterance transcription. If the learning feature were applied to test data, the audio metrics attributed to future test data could be skewed.

The ASR Engine 406 transcribes 422 the audio signal into at least one textual candidate transcription. Each candidate transcription, for example, can be associated with a confidence rating regarding the match between the utterance received in the audio signal and the candidate transcription generated by the ASR Engine 406.

The ASR Engine 406 optionally provides 424 the candidate transcription(s) to a search engine. In some implementations, the ASR Engine 406 provides the candidate transcription(s) to the search engine along with an indication that the candidate transcription(s) relate to test data. The search engine, for example, can recognize the indication and disable one or more statistical or learning features.

In some implementations, the ASR Engine 406 does not provide the candidate transcription(s) to the search engine. Because the query message includes test data, the actual query result may not be needed by the mobile device 404 or the testing computer 402. Additionally, query statistics and learning models of the search engine could be adversely affected by receiving hundreds or thousands of test data query requests.

The ASR Engine 406 generates 426 one or more audio metrics related to the audio signal. In some examples, the ASR Engine 406 can evaluate the audio signal for an amount of clipping, a gain, a signal-to-noise ratio (SNR), an onset point, or an offset point of the audio signal.

The ASR Engine 406 optionally updates 428 a device-specific model. If, for example, the voice search query message included a device type indication, a device-specific model subset of the acoustic model of the ASR Engine 406 can be updated with the information. In this manner, the acoustic model of the ASR Engine 406, for example, can be enhanced by the third party tester. If a transcription is provided within the query message, the transcription can contribute to updating the device-specific model. In another example, a test type indication within the query message can point to audio test data accessible to the ASR Engine 406. A transcription or other information regarding the audio test data used to set up the query message can thus be retrieved by the ASR Engine 406.

The ASR Engine 406 issues 430 a response message to the mobile device 404, including the candidate transcription(s), one or more audio metrics, and, optionally, the recorded audio signal.

The mobile device 404 provides 432 test data, including the audio signal recording, the candidate transcription(s), and the audio metrics to the testing computer 402. In some implementations, the mobile device 404 provides information received in the response message, as well as a recording of the audio signal (e.g., stored in the mobile device 404) upon receiving the response message from the ASR Engine 406. The testing computer 402, in some implementations, retrieves test data from the mobile device 404 on a scheduled basis (e.g., every N-th test, between each reconfiguration of the mobile device 402, etc.).

The testing computer 402 analyzes 434 the test data. The testing computer 402, for example, can analyze information pertaining to one or more audio tests run on the mobile device 404 to determine the performance of the mobile device 404. In some implementations, audio metrics generated in response to audio test data are compared to baseline values (e.g., related to a mobile device currently on the market) or to desired values (e.g., threshold measurements). The testing computer 402, in some implementations, generates pass or fail ratings regarding one or more audio metrics based upon the analysis.

The testing computer 402 reconfigures 436 the mobile device 404. The hardware configuration, hardware settings, software configuration, or software settings of the mobile device 404, for example, can be modified by the testing computer 402 before issuing further audio tests. In some implementations, the testing computer 402 makes adjustments to one or more configuration parameters based in part upon the analysis of previous test data. Upon reconfiguration, the testing computer 402 can continue to perform audio tests upon the mobile device 404.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification can be implemented in digital electronic circuitry, or in computer software, firmware, or hardware, including the structures disclosed in this specification and their structural equivalents, or in combinations of one or more of them. Embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims can be performed in a different order and still achieve desirable results.

What is claimed is:

1. A system comprising:
   one or more computers and one or more storage devices storing instructions that are operable, when executed by the one or more computers, to cause the one or more computers to perform operations comprising:
   receiving, from a mobile device or a mockup of the mobile device and by an automatic speech recognition (ASR) engine that processes voice search queries for a search engine, (i) a voice search query and (ii) data indicating that the voice search query represents audio test data for a test of an audio quality of an audio signal output by a test audio subsystem configuration of the mobile device or the mockup of the mobile device, wherein the voice search query includes a pre-recorded test utterance used for testing mobile devices or mockups of mobile devices;
   generating, in response to receiving the data indicating that the voice search query represents audio test data for a test of the audio quality of the audio signal output by a test audio subsystem configuration of the mobile device or on the mockup of the mobile device, one or more audio quality metrics that reflect the audio quality of the audio signal output by the test audio subsystem configuration of the mobile device or the mockup of the mobile device; and
   generating a response to the voice search query by the ASR engine, wherein the response references at least one of the one or more audio quality metrics.

2. The system of claim 1, wherein generating one or more audio quality metrics that reflect the audio quality of the audio signal output by the test audio subsystem configuration of the mobile device or the mockup of the mobile device further comprises comparing the audio signal to the pre-recorded test utterance.

3. The system of claim 2, wherein the operations further comprise:
   receiving audio test data including the pre-recorded test utterance and a transcription associated with the pre-recorded test utterance.

4. The system of claim 1, comprising:
   performing speech recognition on the audio signal output by a test audio subsystem configuration of the mobile device or the mockup of the mobile device to select one or more textual, candidate transcriptions that match the pre-recorded test utterance; and
   establishing a speech recognition confidence value for each candidate transcription.

5. The system of claim 4, wherein performing speech recognition on the audio signal output by a test audio subsystem configuration of the mobile device or the mockup of the mobile device to select one or more textual, candidate transcriptions that match the pre-recorded test utterance further comprises performing speech recognition on the audio signal output by a test audio subsystem configuration of the mobile device or the mockup of the mobile device to select an n-best of the candidate transcriptions that have the n-highest speech recognition confidence values.

6. The system of claim 1, wherein generating one or more audio quality metrics that reflect the audio quality of the audio signal output by the test audio subsystem configuration of the mobile device or the mockup of the mobile device further comprises determining an amount of clipping, a gain, a signal-to-noise-ratio (SNR), an onset point, or an offset point of the audio signal.

7. The system of claim 1, wherein the voice search query further includes data that references a third party who is performing the audio test.

8. The system of claim 1, wherein the voice search query further includes data that references a type of audio test being performed.

9. The system of claim 1, wherein:
   the voice search query further includes data that references a type of a mobile device; and
   the operations further comprise updating an acoustic model that is specific to the type of the mobile device, using the audio signal output by a test audio subsystem configuration of the mobile device or the mockup of the mobile device.

10. The system of claim 1, wherein:
    the voice search query further includes data that references a term that is actually being uttered by the pre-recorded test utterance.

11. The system of claim 1, wherein the operations further comprise:
    providing the response to a mobile device from which the voice search query originated.

12. The system of claim 1, the operations further comprising based on the one or more audio quality metrics, determining adjustments for the a test audio subsystem configuration of the mobile device or the mockup of the mobile device.

13. A non-transitory computer-readable medium storing software comprising instructions executable by one or more computers which, upon such execution, cause the one or more computers to perform operations comprising:
    receiving, from a mobile device or a mockup of the mobile device and by an automatic speech recognition (ASR) engine that processes voice search queries for a search engine, (i) a voice search query and (ii) data indicating that the voice search query represents audio test data for a test of an audio quality of an audio signal output by a test audio subsystem configuration of the mobile device or the mockup of the mobile device, wherein the voice search query includes a pre-recorded test utterance used for testing mobile devices or mockups of mobile devices;

generating, in response to receiving the data indicating that the voice search query represents audio test data for a test of the audio quality of the audio signal output by a test audio subsystem configuration of the mobile device or on the mockup of the mobile device, one or more audio quality metrics that reflect the audio quality of the audio signal output by the test audio subsystem configuration of the mobile device or the mockup of the mobile device; and generating a response to the voice search query by the ASR engine, wherein the response references at least one of the one or more audio quality metrics.

14. The medium of claim 13, wherein generating one or more audio quality metrics that reflect the audio quality of the audio signal output by the test audio subsystem configuration of the mobile device or the mockup of the mobile device further comprises comparing the audio signal to the pre-recorded test utterance.

15. The medium of claim 13, wherein generating one or more quality metrics using the audio signal further comprises determining an amount of clipping, a gain, a signal-to-noise-ratio (SNR), an onset point, or an offset point of the audio signal.

16. The medium of claim 13, wherein the voice search query further includes data that references a term that is actually being uttered by the pre-recorded test utterance.

17. A computer-implemented method comprising:
receiving, from a mobile device or a mockup of the mobile device and by an automatic speech recognition (ASR) engine that processes voice search queries for a search engine, (i) a voice search query and (ii) data indicating that the voice search query represents audio test data for a test of an audio quality of an audio signal output by a test audio subsystem configuration of the mobile device or the mockup of the mobile device, wherein the voice search query includes a pre-recorded test utterance used for testing mobile devices or mockups of mobile devices;

generating, in response to receiving the data indicating that the voice search query represents audio test data for a test of the audio quality of the audio signal output by a test audio subsystem configuration of the mobile device or on the mockup of the mobile device, one or more audio quality metrics that reflect the audio quality of the audio signal output by the test audio subsystem configuration of the mobile device or the mockup of the mobile device; and generating a response to the voice search query by the ASR engine, wherein the response references at least one of the one or more audio quality metrics.

18. The method of claim 17, wherein the voice search query is being performed by a manufacturer of the mobile device.

19. The method of claim 17, wherein generating one or more audio quality metrics that reflect the audio quality of the audio signal output by the test audio subsystem configuration of the mobile device or the mockup of the mobile device further comprises comparing the audio signal to the pre-recorded test utterance.

20. The method of claim 17, wherein the voice search query further includes data that references a term that is actually being uttered by the pre-recorded test utterance.

* * * * *